US011640264B2

(12) United States Patent
Benisty et al.

(10) Patent No.: US 11,640,264 B2
(45) Date of Patent: May 2, 2023

(54) PARALLEL COMMANDS OVERLAP DETECTION BASED ON QUEUE-DEPTH

(71) Applicant: Western Digital Technologies, Inc., San Jose, CA (US)

(72) Inventors: Shay Benisty, Beer Sheva (IL); Amir Segev, Meiter (IL)

(73) Assignee: Western Digital Technologies, Inc., San Jose, CA (US)

(*) Notice: Subject to any disclaimer, the term of this patent is extended or adjusted under 35 U.S.C. 154(b) by 44 days.

(21) Appl. No.: 17/460,531

(22) Filed: Aug. 30, 2021

(65) Prior Publication Data

US 2023/0067236 A1    Mar. 2, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/0655; G06F 3/061; G06F 3/0611; G06F 3/0613
See application file for complete search history.

(56) References Cited

U.S. PATENT DOCUMENTS

| | | | |
|---|---|---|---|
| 5,022,004 A * | 6/1991 | Kurtze | G11C 11/4096 365/195 |
| 6,490,635 B1 | 12/2002 | Holmes | |
| 9,448,946 B2 | 9/2016 | Higgins et al. | |
| 10,642,764 B1 | 5/2020 | Gerhart et al. | |
| 10,761,725 B2 | 9/2020 | Palmer | |
| 2013/0132612 A1* | 5/2013 | Chiu | G06F 3/064 710/5 |
| 2015/0032936 A1* | 1/2015 | Yu | G06F 12/0246 711/158 |
| 2015/0046605 A1* | 2/2015 | Barrell | G06F 3/0689 710/5 |
| 2015/0253992 A1 | 9/2015 | Ishiguro et al. | |
| 2016/0110296 A1* | 4/2016 | Bao | G06F 12/1441 711/102 |
| 2018/0173418 A1* | 6/2018 | Li | G06F 3/0656 |
| 2018/0188965 A1* | 7/2018 | Palmer | G06F 3/0688 |
| 2018/0357170 A1* | 12/2018 | Benisty | G06F 12/0804 |
| 2019/0384719 A1* | 12/2019 | Lappi | G06F 3/0679 |
| 2020/0057582 A1* | 2/2020 | Shin | G06F 3/0656 |
| 2020/0293226 A1 | 9/2020 | Singh et al. | |
| 2021/0124525 A1* | 4/2021 | Spencer | G06F 3/0619 |
| 2021/0303457 A1* | 9/2021 | Pasquale | G06F 12/0246 |

* cited by examiner

*Primary Examiner* — Tracy A Warren
(74) *Attorney, Agent, or Firm* — Patterson + Sheridan, LLP; Steven H. VerSteeg

(57) ABSTRACT

The present disclosure generally relates to searching an overlap table for data requested to be read in a plurality of read commands received. Rather than searching the table for data corresponding to each command individually, the searching occurs for the plurality of commands in parallel. Furthermore, the overlap table can comprise multiple data entries for each line. The number of read commands can be accumulated prior to searching, with the accumulating being a function of a queue depth permitted by the host device. Parallel searching of the overlap table reduces the average search time.

20 Claims, 8 Drawing Sheets

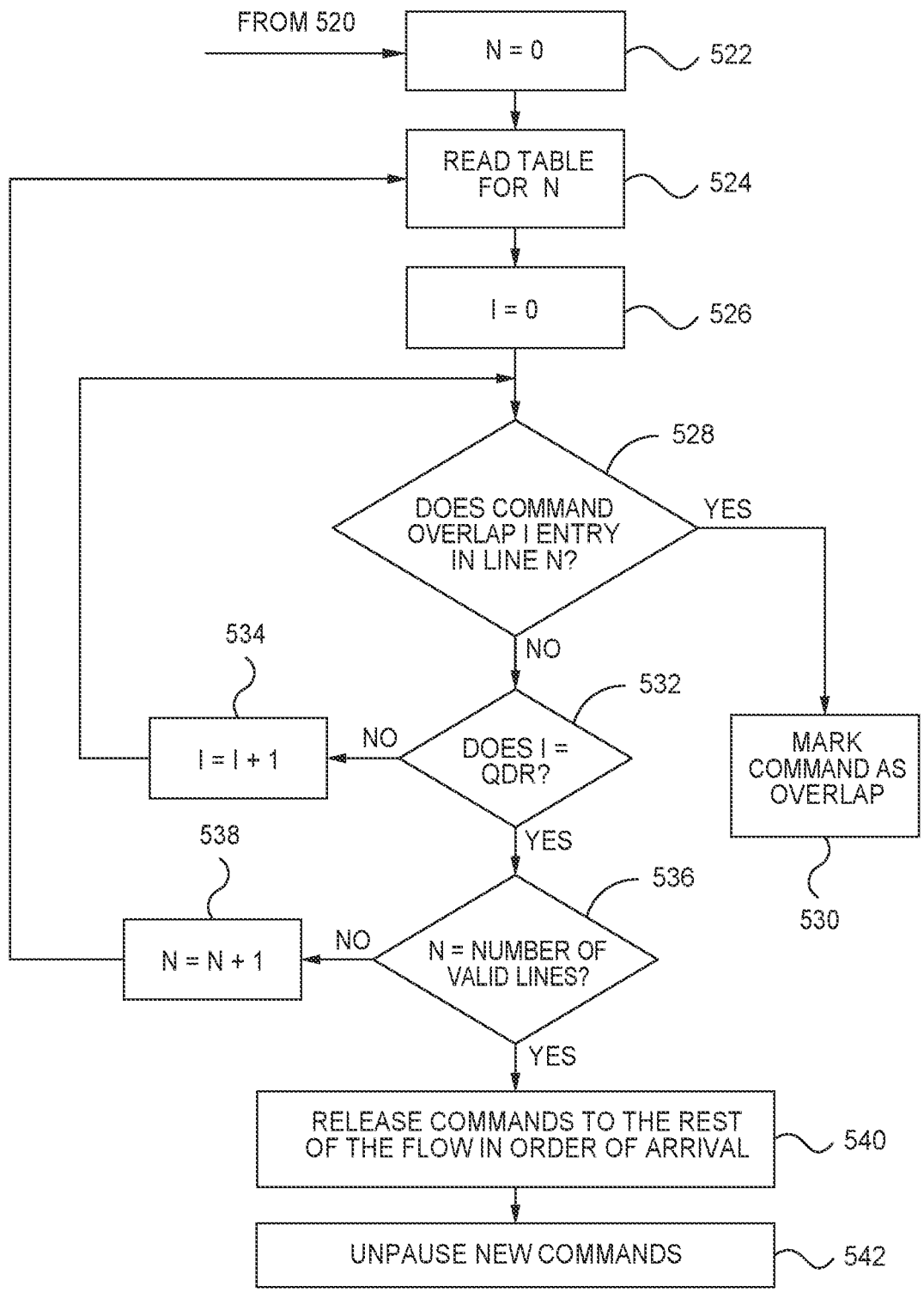
FIG. 5 (CONTINUE)

US 11,640,264 B2

PARALLEL COMMANDS OVERLAP DETECTION BASED ON QUEUE-DEPTH

BACKGROUND OF THE DISCLOSURE

Field of the Disclosure

Embodiments of the present disclosure generally relate to searching an overlap table for data corresponding to a plurality of read commands in parallel.

Description of the Related Art

Non-volatile memory (NVM) solid state devices (SSDs) utilize an overlap mechanism, such as an overlap table to detect an overlap between commands. The detection protects the automaticity and occasionally order of commands.

FIG. 1 illustrates an example of the overlap issue. As shown in FIG. 1, a host device has issued a read from logical block address (LBA) 0 to LBA 40, and a write from LBA 0 to LBA 40. Normally, the write and read commands are done in parallel. When the host device issues two pending commands for both read and write on overlapping ranges, the host device expects to get the data entirely before the write, or entirely after. However, if the write command is not aware of the range of the read command, or the read of the range of the write command, it is possible that the returned data will contain a mix of old data and new data. In the example of FIG. 1, the write data 102 in LBA 0-LBA 40 is the new data. The read data in LBA 0-LBA 20 104A and LBA 30-LBA 40 104C is old data while data in LBA 30-LBA 40 104B is the new data belonging to the write command.

For cache writes, when the host device issues a write command, the data storage device fetches the requested data and then writes the data to the memory device only after posting a completion entry to the host device. The writing to the memory device, and specifically the programming of the data, takes a lot of time which can cause backpressure towards the host device. To overcome the backpressure, multiple writes are accumulated, and the programming is done when programming is optimal after receiving data from multiple commands. However, to allow the data storage device to service more commands, maintain bandwidth, and provide better write quality of service, the write commands are marked as completed towards the host device. The write commands are cached until such time when the write commands can be programmed to the memory device.

Once a write command is completed, an overlapping read command is expected to return the last approved data. However, if the data storage device goes to the memory device to fetch the data, the incorrect data will be fetched since the data is not yet in the memory device, but rather, is in the write cache. As such, for every read command, the data storage device needs to make sure the command does not overlap with cached writes.

For garbage collection, the data storage device has to ensure a host read command provides the correct data and thus needs to track the areas that are being read and written back in that process.

For read look ahead, the data storage device predicts what data will receive the next command to be read and thus prefetches the data from the memory device. To gain from the prefetch, the data storage device needs to track which LBA range has been fetched so that if a read (or write) command arrives to read (or write) the area, the data storage device will detect the range has already been fetched and will skip refetching (or drop the previous fetch in case of an overlapping write).

Cached writes, garbage collection, and read look ahead, as well as other reasons, necessitate the overlap table, which can be quite large. A single data entry for the overlap table can comprise the start LBA of the command as well as the length of the command, and oftentimes a group ID to manage a number of ranges belonging to the same group. With increasing data storage device speed, there is an increasing the amount of data to be stored in an overlap table.

For high queue depths on some data storage devices, the random read performance is 3600 KIOPs which translates to 275 ns on average per command. To compensate for any bubbles in the flow of arriving commands, 275 ns should be smaller. When working in low queue depth situations, latency becomes a critical metric to meet.

For every command that arrives (and sometimes due to internal use like garbage collection) the entire database needs to be scanned for overlaps. When working at 1 GHz, that means less than 275 cycles. As database size increases, 1 GHz is not fast enough to endure high queue depth when bandwidth is critical.

Therefore, there is a need in the art to increase speed in processing read commands that require a scan of an overlap table.

SUMMARY OF THE DISCLOSURE

The present disclosure generally relates to searching an overlap table for data requested to be read in a plurality of read commands received. Rather than searching the table for data corresponding to each command individually, the searching occurs for the plurality of commands in parallel. Furthermore, the overlap table can comprise multiple data entries for each line. The number of read commands can be accumulated prior to searching, with the accumulating being a function of a queue depth permitted by the host device. Parallel searching of the overlap table reduces the average search time.

In one embodiment, a data storage device comprises: a memory device; and a controller coupled to the memory device, wherein the controller is configured to: maintain an overlap table, wherein the overlap table comprises at least one line of data to be written to the memory device, wherein each line of data comprises at least one entry; accumulate a plurality of read commands; and search the overlap table line by line for data corresponding to the plurality of read commands, wherein the searching occurs prior to executing the plurality of read commands, wherein the search for data comprises searching for data corresponding to each read command of the plurality of read commands simultaneously.

In another embodiment, a data storage device comprises: a memory device; and a controller coupled to the memory device, wherein the controller is configured to: maintain an overlap table, wherein the overlap table comprises a first line of data to be written to the memory device and a second line of data to be written to the memory device, wherein the first line of data comprises a first plurality of entries, and wherein the second line of data comprises a second plurality of entries; receive a first read command; search the first line of the overlap table for an entry corresponding to the first read command; receive a second read command; search the second line of the overlap table for an entry corresponding to either the first read command or the second read command; and search the first line of the overlap table for an entry corresponding to the second read command.

In another embodiment, a data storage device comprises: memory means; and a controller coupled to the memory means, wherein the controller is configured to: maintain an overlap table comprising a plurality of lines, wherein each line comprises a plurality of entries of data; accumulate a plurality of read commands, wherein the plurality of read commands corresponds to a number of read commands that a host device sends to the data storage device prior to receiving a completion command from the data storage device; and search an individual line of the plurality of lines for data corresponding to each read command of the plurality of read commands.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to searching an overlap table for data requested to be read in a plurality of read commands received. Rather than searching the table for data corresponding to each command individually, the searching occurs for the plurality of commands in parallel. Furthermore, the overlap table can comprise multiple data entries for each line. The number of read commands can be accumulated prior to searching, with the accumulating being a function of a queue depth permitted by the host device. Parallel searching of the overlap table reduces the average search time.

Figure 1:
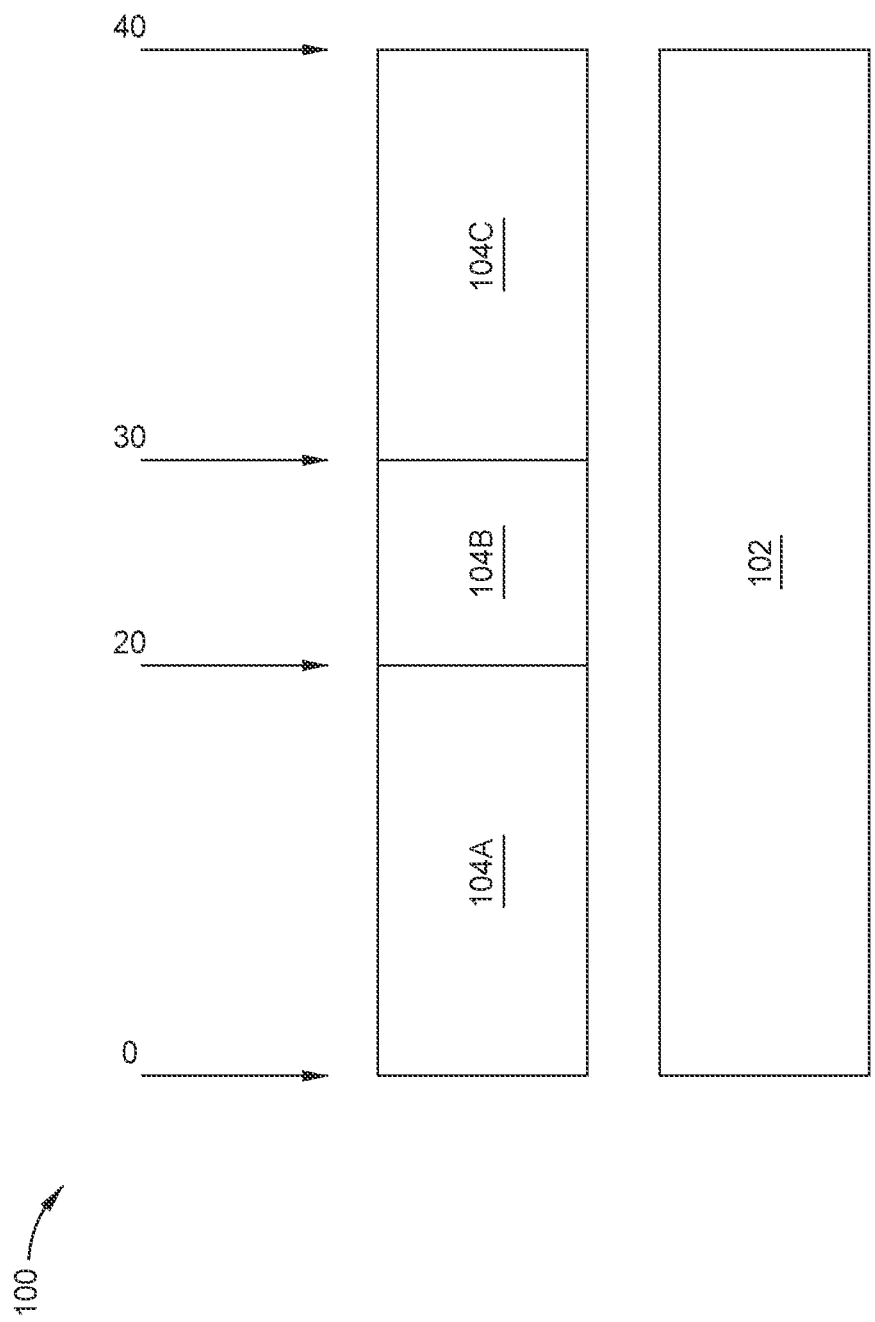
FIG. 1 is a schematic illustration of an overlap issue.
Figure 2:
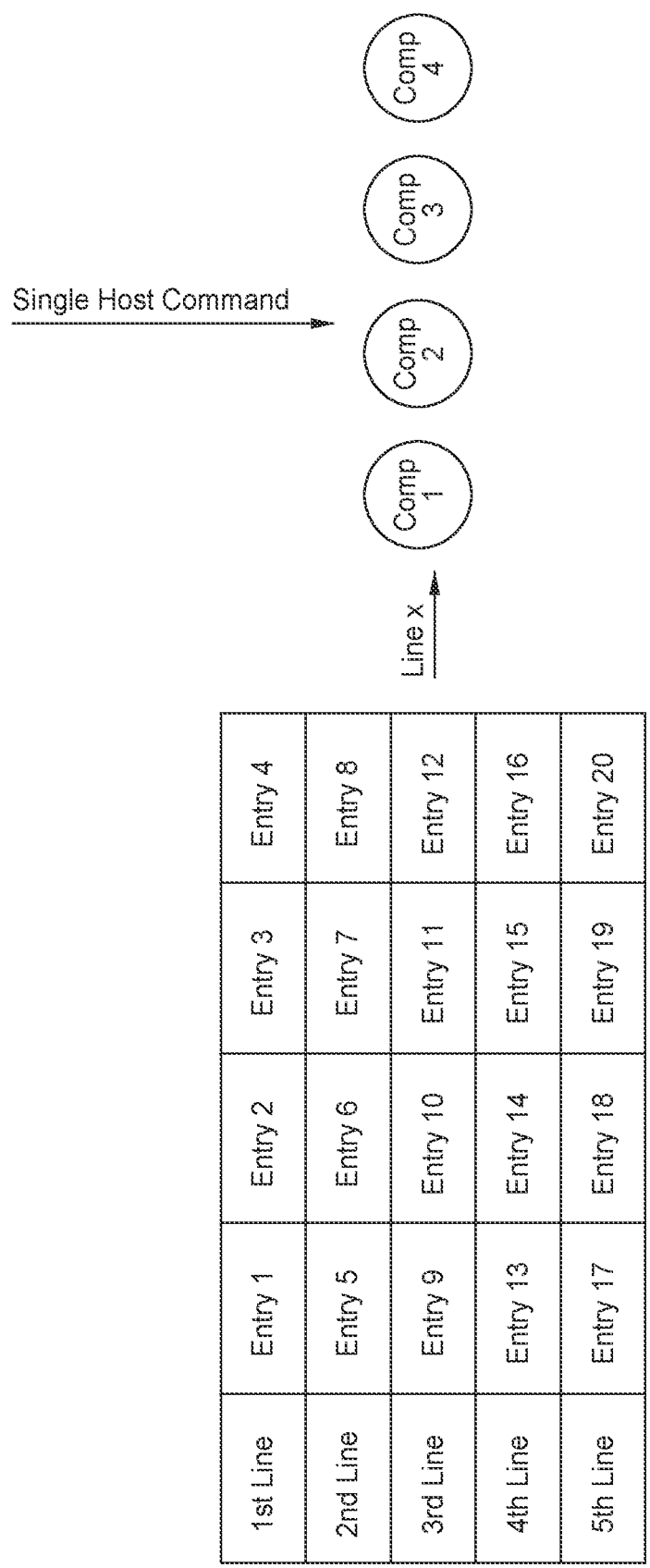
FIG. 2 is a schematic illustration of single command comparison.

Increasing the memory width of the overlap table to multiple entries in a line decreases the number of lines to scan in an overlap table. However, simple increasing the number of entries per line is a bottleneck situation. FIG. 2 is a schematic illustration of single command comparison. In the example shown in FIG. 2, there are five lines that each have four entries. In the scenario of 2560 entries, the total number of lines for a four entries per line situation would be 640 lines, which would require 640 clocks. As noted above, for 1 GHz, there is at most 275 ns or clocks. Thus, simply having multiple entries per line is insufficient to address the need. Increasing the frequency is also insufficient as generating logic at much faster than rates of 1 GHz is currently challenging. Furthermore, a smart search algorithm is a very complex solution. Thus, a different solution would be valuable.

Figure 3:
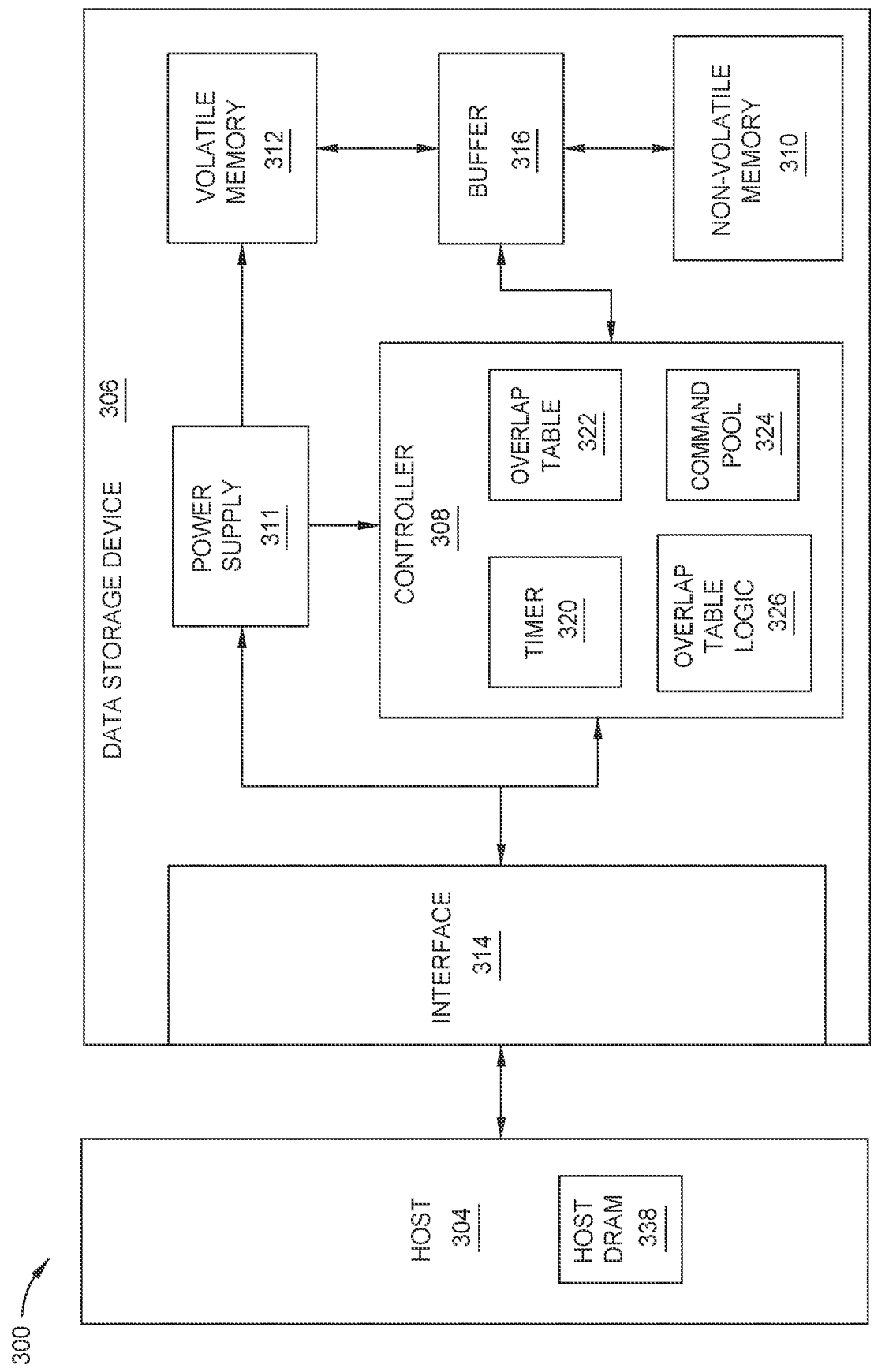
FIG. 3 is a schematic illustration of a storage system according to one embodiment.

FIG. 3 is a schematic illustration of a storage system 300 in which a host device 304 is in communication with a data storage device 306, according to certain embodiments. For instance, the host device 304 may utilize a non-volatile memory (NVM) 310 included in data storage device 306 to store and retrieve data. The host device 304 comprises a host DRAM 338. In some examples, the storage system 300 may include a plurality of storage devices, such as the data storage device 306, which may operate as a storage array. For instance, the storage system 300 may include a plurality of data storage devices 306 configured as a redundant array of inexpensive/independent disks (RAID) that collectively function as a mass storage device for the host device 304.

The host device 304 may store and/or retrieve data to and/or from one or more storage devices, such as the data storage device 306. As illustrated in FIG. 3, the host device 304 may communicate with the data storage device 306 via an interface 314. The host device 304 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 306 includes a controller 308, NVM 310, a power supply 311, volatile memory 312, the interface 314, and a write buffer 316. In some examples, the data storage device 306 may include additional components not shown in FIG. 3 for the sake of clarity. For example, the data storage device 306 may include a printed circuit board (PCB) to which components of the data storage device 306 are mechanically attached and which includes electrically conductive traces that electrically interconnect components of the data storage device 306, or the like. In some examples, the physical dimensions and connector configurations of the data storage device 306 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 306 may be directly coupled (e.g., directly soldered or plugged into a connector) to a motherboard of the host device 304.

Interface 314 may include one or both of a data bus for exchanging data with the host device 304 and a control bus for exchanging commands with the host device 304. Interface 314 may operate in accordance with any suitable protocol. For example, the interface 314 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 314 (e.g., the data bus, the control bus, or both) is electrically connected to the controller 308, providing an electrical connection between the host device 304 and the controller 308, allowing data to be exchanged between the host device 304 and the controller 308. In some examples, the electrical connection of interface 314 may also permit the data storage device 306 to receive power from the host device 304. For example, as illustrated in FIG. 3, the power supply 311 may receive power from the host device 304 via interface 314.

The NVM 310 may include a plurality of memory devices or memory units. NVM 310 may be configured to store and/or retrieve data. For instance, a memory unit of NVM 310 may receive data and a message from controller 308 that instructs the memory unit to store the data. Similarly, the memory unit may receive a message from controller 308 that instructs the memory unit to retrieve data. In some examples, each of the memory units may be referred to as a die. In some examples, the NVM 310 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 310 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 308 may write data to and read data from NVM flash memory devices at the page level and erase data from NVM flash memory devices at the block level.

The power supply 311 may provide power to one or more components of the data storage device 306. When operating in a standard mode, the power supply 311 may provide power to one or more components using power provided by an external device, such as the host device 304. For instance, the power supply 311 may provide power to the one or more components using power received from the host device 304 via interface 314. In some examples, the power supply 311 may include one or more power storage components configured to provide power to the one or more components when operating in a shutdown mode, such as where power ceases to be received from the external device. In this way, the power supply 311 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 312 may be used by controller 308 to store information. Volatile memory 312 may include one or more volatile memory devices. In some examples, controller 308 may use volatile memory 312 as a cache. For instance, controller 308 may store cached information in volatile memory 312 until the cached information is written to the NVM 310. As illustrated in FIG. 3, volatile memory 312 may consume power received from the power supply 311. Examples of volatile memory 312 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 308 may manage one or more operations of the data storage device 306. For instance, controller 308 may manage the reading of data from and/or the writing of data to the NVM 310. In some embodiments, when the data storage device 306 receives a write command from the host device 304, the controller 308 may initiate a data storage command to store data to the NVM 310 and monitor the progress of the data storage command. Controller 308 may determine at least one operational characteristic of the storage system 300 and store the at least one operational characteristic in the NVM 310. In some embodiments, when the data storage device 306 receives a write command from the host device 304, the controller 308 temporarily stores the data associated with the write command in the internal memory or write buffer 316 before sending the data to the NVM 310.

Controller 308 includes a timer 320, an overlap table 322, and a command pool 324. In one embodiment, the overlap table 322 may be stored in DRAM. In another embodiment, the overlap table 322 may be stored in SRAM. In still another embodiment, the overlap table 322 may be stored in the volatile memory 312 that is coupled to the controller 308. In one embodiment, the command pool 324 may be stored in DRAM. In another embodiment, the command pool 324 may be stored in SRAM. In still another embodiment, the command pool 324 may be stored in the volatile memory 312 that is coupled to the controller 308. The timer 320 is configured to calculate a time between receipt of a first read command in the command pool 324 and a predetermined threshold. Once the threshold is reached, all read commands in the command pool 324 are processed by checking the overlap table 322 for a match, regardless of whether the command pool 324 is full. Overlap table logic 326 is also present to coordinate the storage and scanning of data in the overlap table 322.

As will be discussed below, parallelizing the number of commands on which a search is performed, along with multiple entries per line in the overlap table results in a much faster scan of the overlap table. The parallelism is based upon queue depth. The higher the queue depth, the more parallelism that will be performed. The lower the queue depth, the less parallelism that will be performed. Combining parallel command comparison along with queue depth determination achieves the desired results by solving both bandwidth issues (solved by high queue depth) and latency issues (solved by low queue depth). In low queue depth, the latency is very important and therefore the threshold would be one for parallel execution. In higher queue depths, more parallelism is possible as latency is less important compared to power and performance.

For parallel command comparisons, the following equations is used to check for overlaps:

$$(ADDR <= S\_ADDR + S\_SIZE - 1) \&\& (ADDR + SIZE - 1 >+ S\_ADDR)$$

Figure 4A:
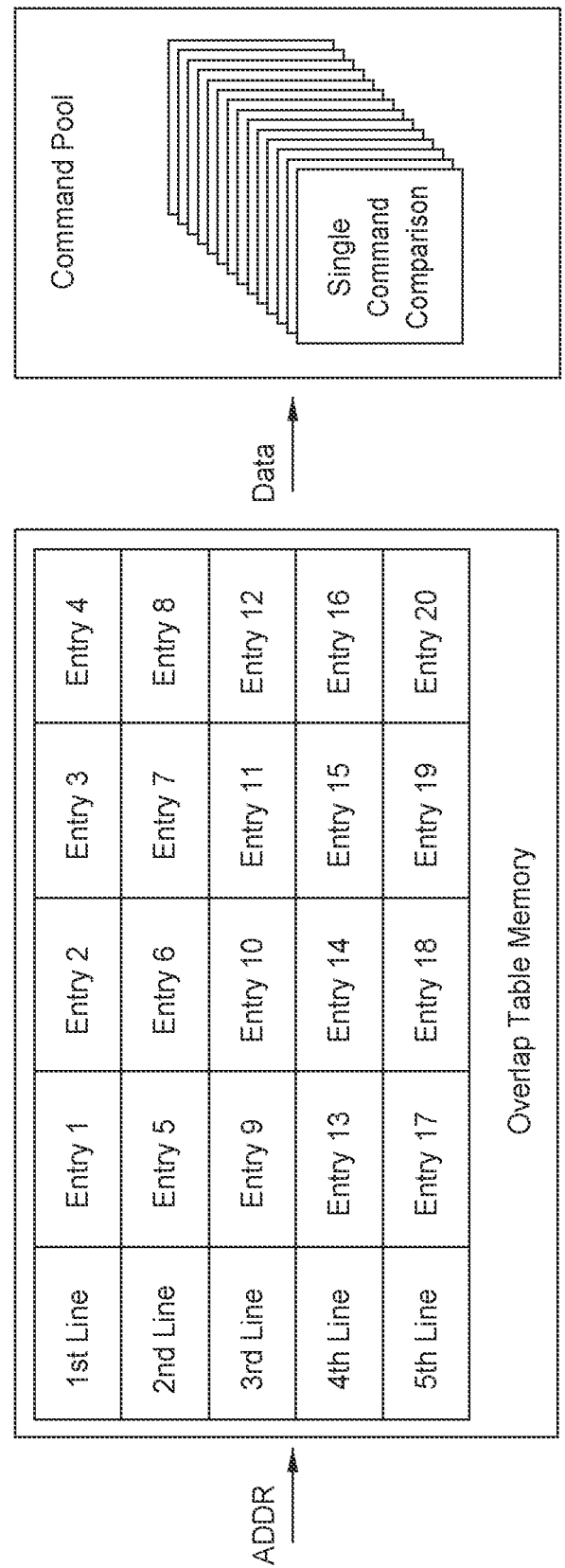
FIG. 4A is a schematic illustration of parallel command comparison according to one embodiment.

ADDR is the command's address, SIZE is the command's size. S_ADDR and S_SIZE address the stored range in the database. The equation results in two comparators. If looking at four entries per lint in the table, the requirement is eight comparators. FIG. 4A is a schematic illustration of parallel command comparison according to one embodiment. In FIG. 4A, the number of commands is parallelized. FIG. 4A exemplifies five lines with four entries per line. The command pool contains sixteen commands.

The commands that are parallelized are done with a single line read from the table. In the embodiment of FIG. 4A, there are sixteen commands in the command pool and four entries per line. As shown in the above equation, there are two comparators per entry. Hence, there are sixteen commands multiplied by four entries multiplied by two comparators per entry to result in one hundred twenty eight comparators. It is to be understood that the example shown in FIG. 4A is simply an example. It is to be understood that more or less entries can be present per line and more or less commands may be present in the command pool. For example, there could be three entries per line and ten commands in the pool which would result in sixty comparators.

In regards to queue depth, the queue depth is calculated by the number of commands that are held internally in the data storage device on average. Overlap table logic is implemented in the controller of the data storage device to calculate the queue depth. The queue depth calculation may be implemented in either firmware or hardware. The average queue depth is the average number of commands that the host device will send to the data storage device without requiring a completion command to be posted to the host device. An example of queue depth could be the following: high queue depth has an overlap parallelism of 16 (i.e., latency is not an issue and bandwidth is important); mid-high queue depth has an overlap parallelism of 8; mid queue depth has an overlap parallelism of 4; low-mid queue depth has an overlap parallelism of 2; and low queue depth has an overlap parallelism of 1 (i.e., latency is important while performance is not). It is again to be understood that the terms high, mid-high, mid, low-mid, and low are examples, and the overlap parallelism associated with the terms is not fixed, other than the low queue depth.

Figure 4B:
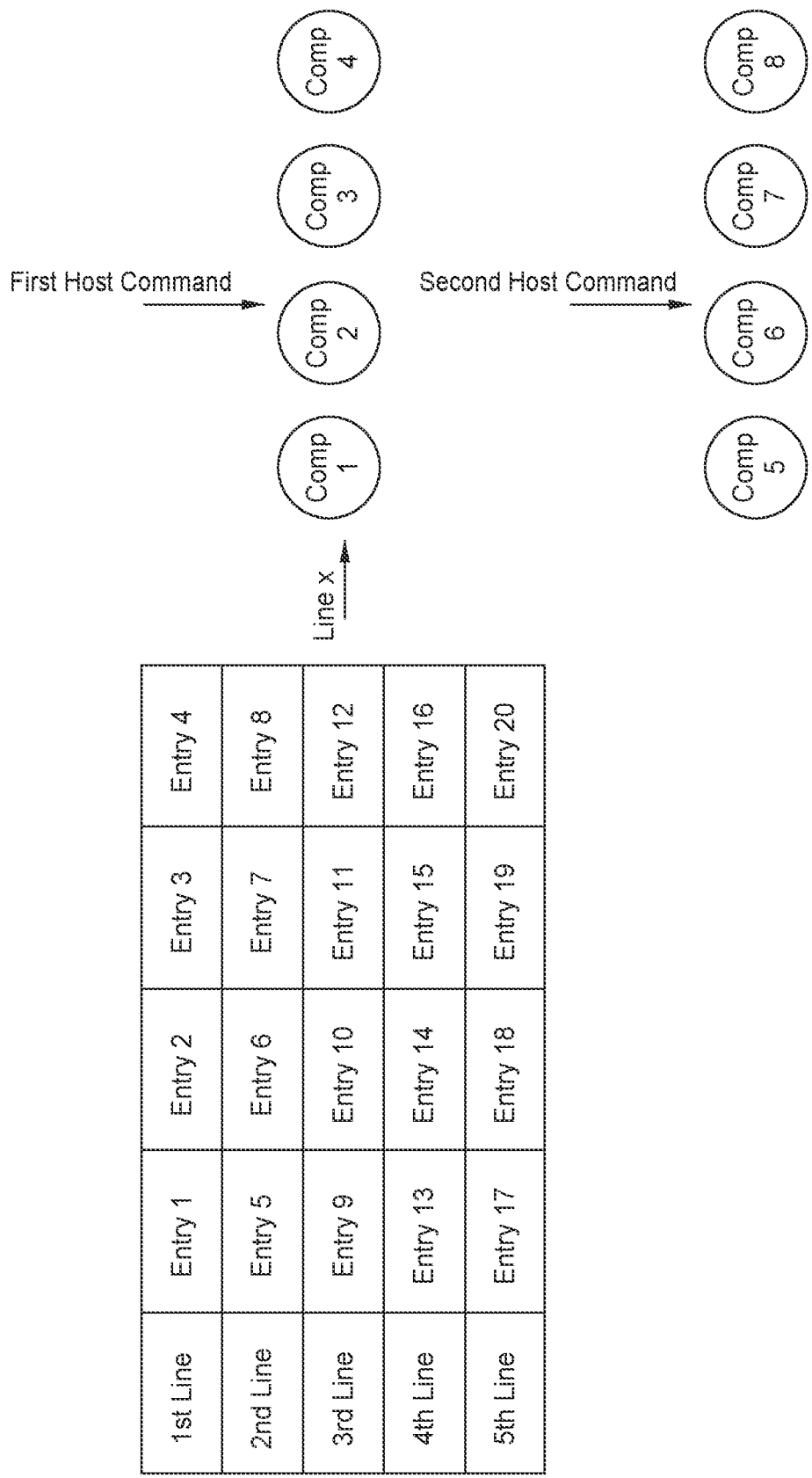
FIG. 4B is a schematic illustration of parallel command comparison according to another embodiment.

FIG. 4B is a schematic illustration of parallel command comparison according to another embodiment. Similar to FIG. 4A, the overlap table comprises five lines with four entries per line. However, in FIG. 4B, there are two commands that are each scanning different lines simultaneously. When scanning the lines, each command is scanning four entries per line. Hence, similar to FIG. 4A, two commands will be scanning multiple entries per line, but the two commands are scanning different lines whereas in FIG. 4A, the multiple commands are scanning the same line at the same time. Hence, FIG. 4B illustrates double parallelism. In the example of FIG. 4B, it is contemplated that more than two commands may be present which each command scanning a separate line simultaneously.

Figure 4C:
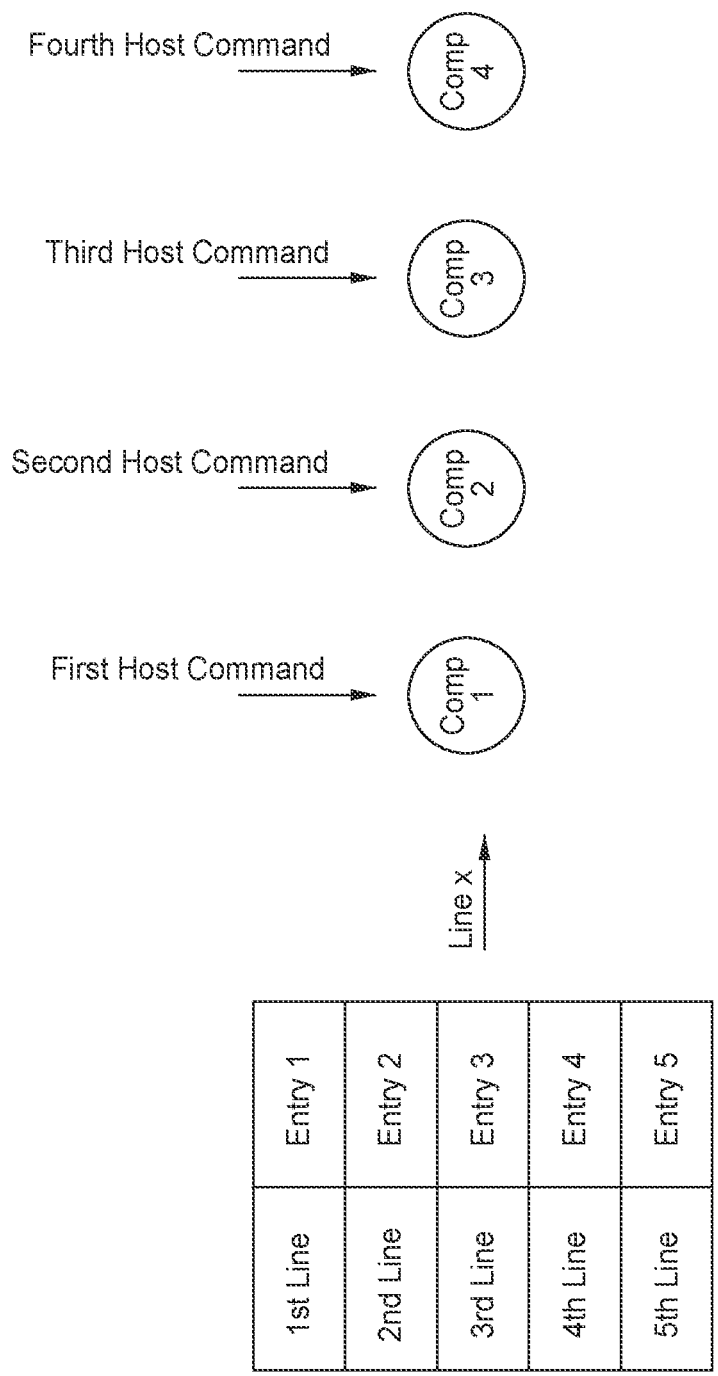
FIG. 4C is a schematic illustration of parallel command comparison according to another embodiment.

FIG. 4C is a schematic illustration of parallel command comparison according to another embodiment. FIG. 4C illustrates command parallelism where each line contains only a single entry, but multiple commands are scanning the same line simultaneously. It is to be understood that while four commands have been illustrated, more or less commands are contemplated.

Hence, in considering FIGS. 4A-4C, there are three embodiments for improving overlap table usage: use multiple commands simultaneously to scan a single line of an overlap table where the line contains multiple entries; use multiple commands to simultaneously scan different lines of an overlay table where the lines contain multiple entries; and use multiple commands to simultaneously scan a single line of an overlap table where the line contains a single entry.

Figure 5:
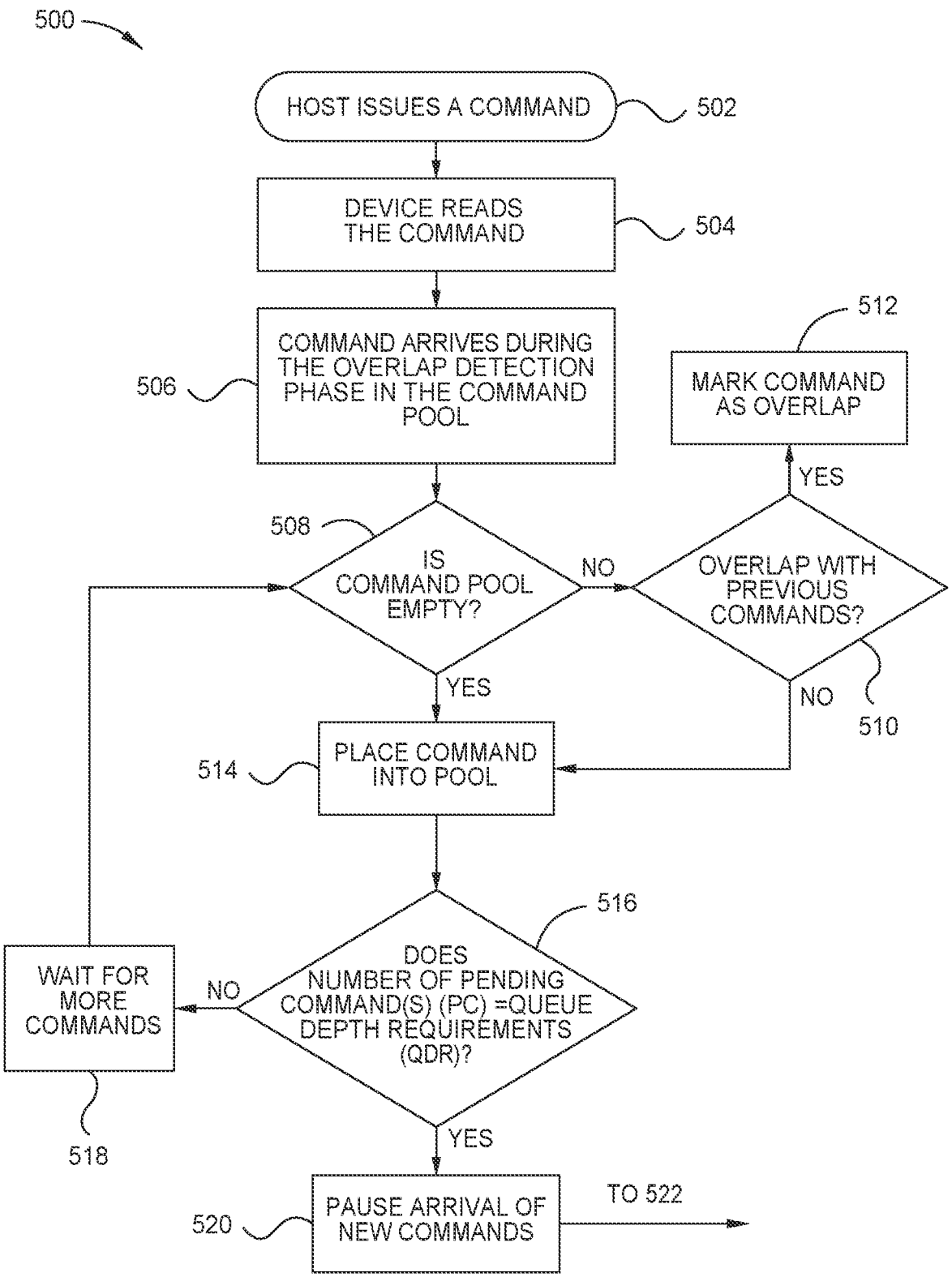
FIG. 5 is a flowchart illustrating parallel command processing according to one embodiment.

FIG. 5 is a flowchart 500 illustrating parallel command processing according to one embodiment. FIG. 5 illustrates the algorithm that uses the required performance metric (i.e., bandwidth vs. latency) to decide how much parallelism to do in the scanning of the overlap table. The scanning is then done for multiple commands in parallel to overcome the large database problem that surfaces during high queue depth.

Initially, a host device issues a read command at 502. The data storage device then reads the command at 504. The read command arrives into the command pool during the overlap detection phase in 506. A determination is made regarding whether the command pool is empty at 508. If the command pool is empty, then the command is placed into the command pool at 514. If the command pool is not empty, then at 510 a determination is made regarding whether the command overlaps with any previous command stored in the command pool. If there the read command overlaps with a previous command stored in the command pool, then the command is marked as an overlap command at 512. If the read command does not overlap with any previous commands stored in the command pool, then the read command is stored in the command pool at 514. A determination is then made regarding whether the number pending commands (PC) is equal to the queue depth requirements (QDR) at 516. If PC does not equal QDR, then the data storage device waits for more commands at 518 and then again determines whether the command pool is empty at 508 for any new incoming read commands. If PC equals QDR, then the data storage device pauses the arrival of new commands at 520.

Now that PC equals QDR, the overlap table can be scanned. At 522, N, which is the line number, is set to 0 for the first line. Then, the overlap table is read for line N at 524. I, which is the entry number, is set to 0 for the first entry at

526. A determination is made regarding whether any overlap command from the command pool overlaps with the entry in line N at entry I at 528. If any command overlaps with entry I in line N, then the command is marked as overlap in line 530. However, if no command overlaps with any entry in line N, then a determination is made regarding whether I equals QDR. If I does not equal QDR, then I is increased by 1 at 534 to check the next entry is checked at 528 and the process of checking each entry continues. However, if I does equal QDR at 532, then a determination is made regarding whether N equals the number of valid lines in the overlap table at 536. If N does not equal the number of valid lines at 536, then N is increased by 1 at 538, the overlap table is read for line N at 524, and I is reset to 0 at 526 and the process of checking each line continues. If N equals the number of valid lines at 536, then the commands are released to the rest of the flow in order of arrival at 540, and the command pool is then empty. Thereafter, new commands may arrive as the new commands are unpaused at 542.

In total, FIG. 5 illustrates how multiple commands can scan multiple entries the same line simultaneously as illustrated in FIG. 4A. Additionally, FIG. 5 illustrates how multiple commands can scan multiple entries of different lines simultaneously as illustrated in FIG. 4B. To illustrate FIG. 4B in FIG. 5, each command will execute 522-538 on different lines simultaneously. However, in regards to FIG. 4B, in one embodiment, 540 and 542 will be executed simultaneously. In regards to FIG. 4B, in another embodiment 540 will be executed independently while 542 will be executed simultaneously. Finally, FIG. 5 illustrates how multiple commands can scan the single entry of a line simultaneously as illustrated in FIG. 4C. To illustrate FIG. 4C in FIG. 5, the determination at 532 will always result in I being equal to QDR.

It is contemplated that the command pool could become 'stuck' waiting for commands if the frequency of read commands from the host device is slow or stops sending read commands. Therefore, a timer may be used to move from 518 to 520 once a time threshold set by the timer is exceeded, even though P does not equal QDR.

In another embodiment, rather than using queue depth, it is contemplated that the overlap table can begin scanning immediately upon receipt of a read command as soon as the first read command reaches that phase in the flow. The next command (i.e., a second read command) to reach will start scanning at the same location as the previous command (i.e., the first read command) is scanning and continue scanning with the first read command. At the end of the table, the first read command is done scanning, but the second read command will circle back to scan the lines of the overlap table that were scanning with the first read command, but not the second read command. Hence, both the first read command and the second read command scan the entire overlap table, but start and finish at different times while scanning at least one line simultaneously. In other words, the first and second read commands have a parallel command operation (as exemplified in FIGS. 4A-4C and 5), but also scan separately and non-simultaneously for at least the first line of the overlap table. It is contemplated that the second read command can start scanning with the first command either at the beginning of a line of the overlap table or within a line at a non-scanning entry of a line. The first read command can begin the process either alone, where each received command is immediately pushed into the process, or together with one or more commands upon expiration of a timer. For example, it is contemplated that once a timer has expired, every read command in the command pool begins the process, but an additional command or commands arrive while the process is ongoing. Those newly arrived command or commands join the already in process read commands for the scanning.

In one embodiment, a data storage device comprises: a memory device; and a controller coupled to the memory device, wherein the controller is configured to: maintain an overlap table, wherein the overlap table comprises at least one line of data to be written to the memory device, wherein each line of data comprises at least one entry; accumulate a plurality of read commands; and search the overlap table line by line for data corresponding to the plurality of read commands, wherein the searching occurs prior to executing the plurality of read commands, wherein the search for data comprises searching for data corresponding to each read command of the plurality of read commands simultaneously. Each entry in a line is searched sequentially. The at least one entry comprises a plurality of entries. The controller is configured to accumulate the plurality of read commands in a command pool. The controller is configured to determine whether the command pool is empty. The controller is configured to determine whether any received read commands overlap with a previously received read command. The controller is configured to determine whether a number of pending read commands that have been accumulated is equal to a queue depth threshold. The controller is configured to pause arrival of new read commands upon reaching a queue depth threshold. The controller is configured to release the plurality of read commands to read data from the memory device upon determining the data to be read is not in the overlap table. The controller is configured to mark a command of the plurality of commands as an overlap command upon determining that an entry in the overlap table corresponds to data to be read for the command. The controller is configured to accumulate read commands until a queue depth threshold is reached. The controller is configured to accumulate read commands until a timing threshold is reached.

In another embodiment, a data storage device comprises: a memory device; and a controller coupled to the memory device, wherein the controller is configured to: maintain an overlap table, wherein the overlap table comprises a first line of data to be written to the memory device and a second line of data to be written to the memory device, wherein the first line of data comprises a first plurality of entries, and wherein the second line of data comprises a second plurality of entries; receive a first read command; search the first line of the overlap table for an entry corresponding to the first read command; receive a second read command; search the second line of the overlap table for an entry corresponding to either the first read command or the second read command; and search the first line of the overlap table for an entry corresponding to the second read command. The controller is further configured to search a first portion of the first line of the overlap table for an entry corresponding to the first read command, wherein the controller is further configured to search a second portion of the first line of the overlap table for an entry corresponding to either the first read command or the second read command, wherein the search of the second portion comprises searching for an entry corresponding to the first read command or the second read command simultaneously. The second command is received prior to searching the second line and after completion of searching the first line. The second command is received prior to completion of searching the first line.

In another embodiment, a data storage device comprises: memory means; and a controller coupled to the memory means, wherein the controller is configured to: maintain an overlap table comprising a plurality of lines, wherein each line comprises a plurality of entries of data; accumulate a plurality of read commands, wherein the plurality of read commands corresponds to a number of read commands that a host device sends to the data storage device prior to receiving a completion command from the data storage device; and search an individual line of the plurality of lines for data corresponding to each read command of the plurality of read commands. The number of read commands accumulated is dynamic. The plurality of read commands is less than the number of read commands that the host device sends prior to receiving a completion command due to reaching an accumulation time threshold. The controller is further configured to pause arrival of new read commands upon reaching a queue depth thresholds, wherein the controller is configured to unpause arrival of new commands upon completion of the search.

By searching for data corresponding to a plurality of read commands in parallel within an overlap table that includes a plurality of lines, an average time per search is reduced as is an amount of power needed to complete the search. The approach supports overlap tables for both high queue depth (i.e., bandwidth) and low queue depth (i.e., latency) using the same logic and command arrival flow The overall number of accesses to the memory is reduced, which saves power. In the example of an overlap table with only a single entry, a low queue depth, which has 2560 lines would require 2560 clock cycles. Due to the command parallelism, a low-mid queue depth of two commands would require only 1280 clock cycles; a mid-queue depth of four commands would require only 640 clock cycles; a mid-high queue depth of eight commands would require only 320 clock cycles; and finally a high queue depth of sixteen commands would require only 160 clock cycles, which is well below the 275 clock cycles of 1 GHz. Increasing the number of entries per line in the overlap table will result in even greater clock cycle (and hence power) savings.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
maintain an overlap table, wherein the overlap table comprises at least one line of data to be written to the memory device, wherein each line of data comprises at least one entry;
accumulate a plurality of read commands; and
search the overlap table line by line for data corresponding to the plurality of read commands, wherein the searching occurs prior to executing the plurality of read commands, wherein the search for data comprises searching for data corresponding to each read command of the plurality of read commands simultaneously; and
return data corresponding to the plurality of read commands to a host.

2. The data storage device of claim 1, wherein each entry in a line is searched sequentially.

3. The data storage device of claim 1, wherein the at least one entry comprises a plurality of entries.

4. The data storage device of claim 1, wherein the controller is configured to accumulate the plurality of read commands in a command pool.

5. The data storage device of claim 4, wherein the controller is configured to determine whether the command pool is empty.

6. The data storage device of claim 4, wherein the controller is configured to determine whether any received read commands overlap with a previously received read command.

7. The data storage device of claim 4, wherein the controller is configured to determine whether a number of pending read commands that have been accumulated is equal to a queue depth threshold.

8. The data storage device of claim 1, wherein the controller is configured to pause arrival of new read commands upon reaching a queue depth threshold.

9. The data storage device of claim 1, wherein the controller is configured to release the plurality of read commands to read data from the memory device upon determining the data to be read is not in the overlap table.

10. The data storage device of claim 1, wherein the controller is configured to mark a command of the plurality of commands as an overlap command upon determining that an entry in the overlap table corresponds to data to be read for the command.

11. The data storage device of claim 1, wherein the controller is configured to accumulate read commands until a queue depth threshold is reached.

12. The data storage device of claim 11, wherein the controller is configured to accumulate read commands until a timing threshold is reached.

13. A data storage device, comprising:
a memory device; and
a controller coupled to the memory device, wherein the controller is configured to:
maintain an overlap table, wherein the overlap table comprises a first line of data to be written to the memory device and a second line of data to be written to the memory device, wherein the first line of data comprises a first plurality of entries, and wherein the second line of data comprises a second plurality of entries;
receive a first read command;
search the first line of the overlap table for an entry corresponding to the first read command;
receive a second read command;
search the second line of the overlap table for an entry corresponding to either the first read command or the second read command;
search the first line of the overlap table for an entry corresponding to the second read command, wherein the searching occurs prior to executing the first read command or the second read command, wherein the search for data comprises searching for data corresponding to the first read command and the second read command simultaneously; and
return data corresponding to the first read command and the second read command to a host.

14. The data storage device of claim 13, wherein the controller is further configured to search a first portion of the first line of the overlap table for an entry corresponding to the first read command, wherein the controller is further configured to search a second portion of the first line of the overlap table for an entry corresponding to either the first read command or the second read command, wherein the search of the second portion comprises searching for an entry corresponding to the first read command or the second read command simultaneously.

15. The data storage device of claim 13, wherein the second command is received prior to searching the second line and after completion of searching the first line.

16. The data storage device of claim 13, wherein the second command is received prior to completion of searching the first line.

17. A data storage device, comprising:
   memory means; and
   a controller coupled to the memory means, wherein the controller is configured to:
      maintain an overlap table comprising a plurality of lines, wherein each line comprises a plurality of entries of data;
      accumulate a plurality of read commands, wherein the plurality of read commands corresponds to a number of read commands that a host device sends to the data storage device prior to receiving a completion command from the data storage device;
      search an individual line of the plurality of lines for data corresponding to each read command of the plurality of read commands, wherein the searching occurs prior to executing the plurality of read commands, wherein the search for data comprises searching for data corresponding to the plurality of read commands simultaneously; and
      return data corresponding to the plurality of read commands to a host.

18. The data storage device of claim 17, wherein the number of read commands accumulated is dynamic.

19. The data storage device of claim 17, wherein the plurality of read commands is less than the number of read commands that the host device sends prior to receiving a completion command due to reaching an accumulation time threshold.

20. The data storage device of claim 17, wherein the controller is further configured to pause arrival of new read commands upon reaching a queue depth thresholds, wherein the controller is configured to unpause arrival of new commands upon completion of the search.

* * * * *